United States Patent
Akamatsu et al.

(10) Patent No.: US 9,021,978 B2
(45) Date of Patent: May 5, 2015

(54) INDICATOR DISPLAYING DEVICE

(71) Applicant: Denso Corporation, Kariya, Aichi-pref. (JP)

(72) Inventors: Naoki Akamatsu, Kariya (JP); Makoto Matsumoto, Okazaki (JP)

(73) Assignee: Denso Corporation, Kariya (JP)

( * ) Notice: Subject to any disclaimer, the term of this patent is extended or adjusted under 35 U.S.C. 154(b) by 239 days.

(21) Appl. No.: 13/649,466

(22) Filed: Oct. 11, 2012

(65) Prior Publication Data

US 2013/0092077 A1 Apr. 18, 2013

(30) Foreign Application Priority Data

Oct. 14, 2011 (JP) ................. 2011-227145

(51) Int. Cl.
*G01D 11/28* (2006.01)
*G01D 13/26* (2006.01)

(52) U.S. Cl.
CPC ............. *G01D 11/28* (2013.01); *G01D 13/265* (2013.01)

(58) Field of Classification Search
CPC ........ G01D 11/24; G01D 11/26; G01D 11/28
See application file for complete search history.

(56) References Cited

U.S. PATENT DOCUMENTS 6,595,667 B1   7/2003   Obata

FOREIGN PATENT DOCUMENTS

| EP | 0 971 209 | 1/2000 | |
|----|-----------|--------|---|
| JP | 63-142725 | 9/1988 | |
| JP | H05-028491 | 4/1993 | |
| JP | 2001-099685 | 4/2001 | |
| JP | 3505881 | 3/2004 | |
| JP | 2005-024418 | 1/2005 | |
| JP | 3747452 | 2/2006 | |
| JP | 2007-064660 | 3/2007 | |
| JP | 2009-198349 | 9/2009 | |
| WO | WO 2006115100 A1 * | 11/2006 | ............ G01D 11/28 |
| WO | WO 2010137478 A1 * | 12/2010 | |

OTHER PUBLICATIONS

English translation of WO 2010137478 to Tomono.*

* cited by examiner

*Primary Examiner* — Laura Martin
*Assistant Examiner* — Irving A Campbell
(74) *Attorney, Agent, or Firm* — Harness, Dickey & Pierce, PLC (57) ABSTRACT

A combination meter has an indicator for radiating light having entered from an entrance portion thereof and a display panel having a displaying portion illuminated by light passing through such portion. A cylindrical body is inserted into a panel-side opening of the display panel. The cylindrical body has a body-side supporting portion so as to hold the display panel between the body-side supporting portion and a housing-side supporting portion. An outer peripheral reflecting portion formed in the cylindrical body reflects light toward a housing-side reflecting portion of a housing. Light emitted from a light source not only illuminates the indicator but also is reflected by the respective reflecting portions to illuminate the displaying portion.

6 Claims, 7 Drawing Sheets

INDICATOR DISPLAYING DEVICE

CROSS REFERENCE TO RELATED APPLICATION

This application is based on Japanese Patent Application No. 2011-227145 filed on Oct. 14, 2011, the disclosure of which is incorporated herein by reference.

TECHNICAL FIELD

The present disclosure relates to an indicator displaying device for a vehicle, which has a rotatable indicator and a display unit for displaying information together with the indicator.

BACKGROUND

A large number of light sources (such as, light emitting diodes) have been used in a conventional indicator displaying device for a vehicle. According to an instrumental device, for example, as disclosed in Japanese Patent No. 3301077 (FIGS. 4 and 5), not only an indicator but also a displaying portion at a front panel surface is illuminated by light emitted from a light source, so as to reduce a number of light sources and thereby to reduce cost for the indicator displaying device.

More in detail, according to the instrumental device of the above prior art (JP Patent No. 3301077), a first reflecting portion is arranged at a position close to an opening of a front panel so as to reflect light from the light source toward an outer peripheral side. In addition, a second reflecting portion is arranged so as to further reflect the light reflected from the first reflecting portion toward a displaying portion of the front panel. The displaying portion of the front panel is illuminated by the light, which is reflected by the first and second reflecting portions and passes through such displaying portion.

According to the instrumental device of the above prior art (JP Patent No. 3301077), a portion of the front panel neighboring to the opening is generally interposed between other related members, so that the front panel is fixed to a housing. For example, according to another prior art, as disclosed in Japanese Utility Model Publication No. H05-28491, a dial plate is interposed between a light guiding plate and a fixing member, which is inserted into an opening of the dial plate. A rotating shaft of an indicator passes through the opening of the dial plate. In addition, according to a further prior art, for example, as disclosed in Japanese Patent Publication No. 2009-198349, a display panel is held between a housing and a fixing member, which is inserted into an opening of the display panel.

According to the above prior art (JP Patent No. 3301077), a number of light sources for illuminating the displaying portion formed in the front panel can be reduced. On the other hand, however, it is necessary to provide the first reflecting portion for reflecting the light toward the second reflecting portion. It is, therefore, difficult to reduce a number of parts and components for the instrumental device in this prior art. According to the other prior arts (JP UM Publication No. H05-28491 or JP Patent Publication No. 2009-198349), it is difficult to design a shape of the fixing member suitable for holding the display panel between the fixing member and the housing, because there exists a first reflecting portion provided at a position close to the opening of the display panel. On the other hand, in a case that the shape of the fixing member is so designed as to be suitable for holding the display panel between the fixing member and the housing, it may become difficult to arrange the first reflecting portion at such a position, which is suitable for reflecting the light toward the second reflecting portion. As above, it is difficult to meet both of requirements, one of which is to hold the display panel to the housing in a simple structure and the other of which is to effectively illuminate the displaying portion of the display panel.

SUMMARY OF THE DISCLOSURE

The present disclosure is made in view of the above problems. It is an object of the present disclosure to provide an indicator displaying device for a vehicle, according to which a display panel is fixed to a housing in a simple manner and a displaying portion of the display panel is effectively illuminated. It is a further object of the present disclosure to reduce a number of parts and components for the indicator displaying device.

According to a feature of the present disclosure, an indicator displaying device comprises:

a rotatable indicator; and a display unit for displaying information together with the indicator.

The rotatable indicator includes; a shaft portion around which the indicator is rotated; and an entrance portion through which light enters the indicator, so that the indicator is illuminated by the light having entered from the entrance portion.

The display unit includes; an opening through which the shaft portion passes; and a displaying portion provided at an outer peripheral side of the opening and illuminated by light passing therethrough.

The indicator displaying device further comprises;

a first light source opposing to the entrance portion in an axial direction of the shaft portion across the opening, the first light source emitting light which enters the entrance portion;

a housing having; a housing-side supporting portion for supporting the display unit; and a housing-side reflecting portion for reflecting light toward the displaying portion; and a cylindrical body inserted into the opening in the axial direction of the shaft portion, the cylindrical body having a body-side supporting portion in order to hold the display unit between the body-side supporting portion and the housing-side supporting portion, the cylindrical body further having an outer peripheral surface which is tapered in a direction toward the first light source and which forms an outer peripheral reflecting portion for reflecting the light from the first light source toward the housing-side reflecting portion.

According to the above feature, the cylindrical body is inserted into the opening of the display unit and a display panel thereof is interposed between the body-side supporting portion and the housing-side supporting member. Since the light source is opposed to the entrance portion of the indicator across the opening of the display panel, a part of the light emitted from the light source passes through an inside of the cylindrical body and enters the entrance portion of the indicator. The indicator is illuminated by the light having entered the indicator through the entrance portion.

The other part of the light emitted from the light source is reflected toward the housing-side reflecting portion by the outer peripheral reflecting portion, which is formed at the outer peripheral surface of the cylindrical body. The outer peripheral surface of the cylindrical body is tapered toward an axial lower end of the cylindrical body, that is, in a direction to the light source. The housing-side reflecting portion is opposed to the displaying portion of the display panel, so as to reflect the light (reflected by the outer peripheral reflecting portion) to the displaying portion. As above, the light respectively reflected by the reflecting portions passes through the displaying portion, so that the displaying portion is illuminated.

According to the above structure, the function for supporting the display panel and the function for reflecting the light are combined together and incorporated into the cylindrical body. It is, therefore, possible not only to design the shape of the cylindrical body suitable for supporting the display panel but also to arrange the outer peripheral reflecting portion at such a position suitable for reflecting the light toward the housing-side reflecting portion. The supporting of the display panel and the illumination of the displaying portion can be compatible. In addition, it becomes possible to reduce a number of light sources. As above, the display panel can be surely supported, the illumination for the displaying portion can be effectively done, and a number of parts and components can be reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

The present disclosure will be explained by way of multiple embodiments with reference to the drawings. The same reference numerals are used throughout the embodiments for the purpose of designating the same or similar part or portion, so that repeated explanation will be eliminated.

(First Embodiment)

Figure 1:
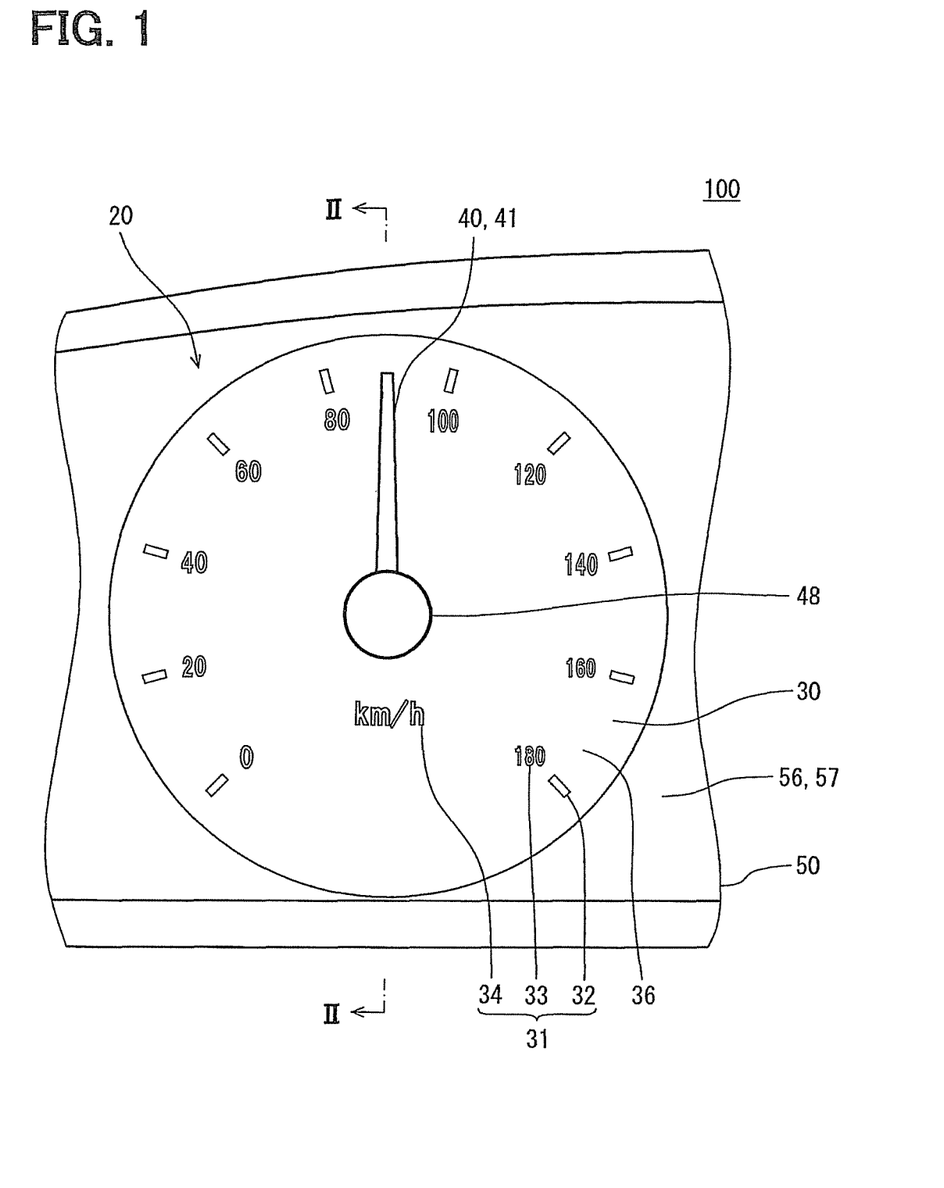
FIG. 1 is a schematic front view showing a combination meter for a vehicle according to a first embodiment of the present disclosure.

FIG. 1 is a front view of a combination meter 100 according to a first embodiment of the present disclosure. The combination meter 100 is accommodated in an instrument panel, which is installed in a passenger compartment of a vehicle. A front side of FIG. 1 is directed to a vehicle driver.

A basic structure of the combination meter 100 will be explained hereinafter. The combination meter 100 is a display device for displaying various kinds of information relating to the vehicle. As shown in FIG. 1, the combination meter 100 is composed of a speed meter 20, a tachometer, a coolant temperature gauge, a fuel gauge and so on.

The speed meter 20 displays speed of the vehicle, in which the combination meter 100 is mounted. The display of information by the speed meter 20 is made by a displaying portion 31 and an indicator 40. The displaying portion 31 is formed on a display panel 30 and composed of scale marks 32, numerical characters 33 and a unit 34.

The display panel 30 is formed in a disc shape. The displaying portion 31 formed on the display panel 30 allows light to pass in a displaying direction from the combination meter 100 toward a driver seat, so that the displaying portion 31 radiates the light. The scale marks 32 are arranged along an outer periphery of the display panel 30, so that the scale marks 32 are arranged in a circular form and at equal intervals in a circumferential direction. The numerical characters 33 are designs copying Arabic numerals for displaying vehicle speed. Each of the numeral characters 33 is arranged at a radial inner side of the respective scale marks 32, which are arranged in the circular shape. The unit 34 is a design copying Arabic numerals and a symbol so as to show a speed unit. The indicator 40 emits light by radiating the light. The indicator 40 is rotated on a front surface of the display panel 30 to indicate the scale mark 32. According to the above structure, the display panel 30 and the indicator 40 collaborate with each other so as to display the information.

A mechanical structure of the combination meter 100 will be explained with reference to FIGS. 1 and 2. The combination meter 100 is composed of a housing 50, a fixing member 70 and an electric circuit board 80, in addition to the above display panel 30 and the indicator 40.

The display panel 30 is made of resin, a basic material of which is formed of translucent material. A light shielding portion 36 and an opening 35 (a panel-side opening) are formed in the display panel 30, in addition to the displaying portion 31. The light shielding portion 36 is formed by printing light shielding material on the display panel 30. Printing of the light shielding material is made on a surface area of the display panel 30 except for the displaying portion 31. The panel-side opening 35 is a circular opening formed at a center of the display panel 30. The displaying portion 31 is located at an outer peripheral side of the panel-side opening 35.

The indicator 40 is composed of a cap member 48, a step motor 46, a pointer 41 and so on. The cap member 48 is made of resin having light blocking effect and covers the panel-side opening 35 of the display panel 30 from the front surface thereof. The step motor 46 is a component for rotating the pointer 41 and mounted to the circuit board 80. The step motor 46 has a driving shaft 44 extending in the displaying direction from a motor body toward the front surface of the display panel 30. The pointer 41 is made of translucent resin and extends in a radial direction from a portion of the cap member 48 toward the outer periphery of the display panel 30. The pointer 41 has an entrance portion 42 and a connecting portion 43. The entrance portion 42 is a portion through which light enters the pointer 41. The entrance portion 42 is directed in an opposite direction to the displaying direction (the opposite direction is referred to as a rear-side direction, while the displaying direction is also referred to as a front-side direction). The light having entered the pointer 41 through the entrance portion 42 is radiated in the front-side direction, so that the pointer 41 emits the light. The connecting portion 43 is formed in a cylindrical shape extending in the rear-side direction from a body portion of the pointer 41. The connecting portion 43 is fixed to the driving shaft 44 so that the connecting portion 43 is rotated together with the driving shaft 44. The connecting portion 43 forms a shaft portion 45 together with the driving shaft 44, wherein the shaft portion 45 passes through the panel-side opening 35 of the display panel 30 and works as a center axis for the rotation of the indicator 40.

The housing 50 forms a frame of the combination meter 100 for accommodating the display panel 30, the indicator 40, the fixing member 70 and the circuit board 80 so as to protect them from dust and/or grime in the surrounding air. The housing 50 is so formed that a front panel 58, a rear cover 59 and so on are assembled to a main body member 57 (of the housing 50) fixed to the display panel 30.

The main body member 57 of the housing 50 is made of the resin having the light blocking effect. An opening 51 (a housing-side opening), a reflector 53 and a facing portion 56 are formed in the main body member 57. The housing-side opening 51 is formed by a cylindrical wall portion and coaxially arranged with the panel-side opening 35. The shaft portion 45 of the indicator 40 passes through a space in an inner peripheral side of the housing-side opening 51. An upper end of the cylindrical wall portion for the housing-side opening 51 works as a housing-side supporting portion 52, which supports a circumferential portion of the panel-side opening 35 in the front-side direction.

The reflector 53 is arranged at a rear side of the display panel 30 to form a housing-side reflecting portion 54. The reflector 53 is curved in a parabolic shape so that the reflector 53 comes closer to the display panel 30 when it goes in a direction to the outer periphery of the display panel 30. The housing-side reflecting portion 54 is formed by a front-side surface of the curved reflector 53. The reflecting portion 54 faces to a rear-side surface of the display panel 30 so as to reflect light in the front-side direction to the displaying portion 31. White painting is coated on the surface of the reflecting portion 54 in order to increase degree of reflection. The facing portion 56 is so formed as to surround the speed meter 20. Such a painting is coated on a front-side surface of the facing portion 56 so as to keep down diffused reflection.

As shown in FIGS. 2 and 4 to 6, the fixing member 70 is made of black-colored resin having light blocking effect and formed in a cylindrical shape. The fixing member 70 is inserted into the panel-side opening 35 and the housing-side opening 51 in the axial direction of the shaft portion 45 toward the rear side of the display panel 30. As a result that the fixing member 70 is inserted into the panel-side opening 35 and the housing-side opening 51, the circumferential portion of the panel-side opening 35 is positioned to the housing-side opening 51 and the display panel 30 is fixed to the main body member 57. The fixing member 70 has a main body 77 and a panel supporting portion 75.

The main body 77 is formed in a cylindrical shape extending in the axial direction of the shaft portion 45. The main body 77 is inserted into the panel-side opening 35 and the housing-side opening 51. The fixing member 70 is held by the housing-side opening 51 by insert-fitting between the main body 77 and the housing-side opening 51. The panel supporting portion 75 is formed at an axial end of the main body 77 on the front side of the display panel 30. The panel supporting portion 75 extends from the main body 77 in a radial direction and formed in an annular flanged shape. The panel supporting portion 75 supports the circumferential portion of the panel-side opening 35 in the rear-side direction. As above, the display panel 30 is interposed between the panel supporting portion 75 and the housing-side supporting portion 52.

Figure 2:
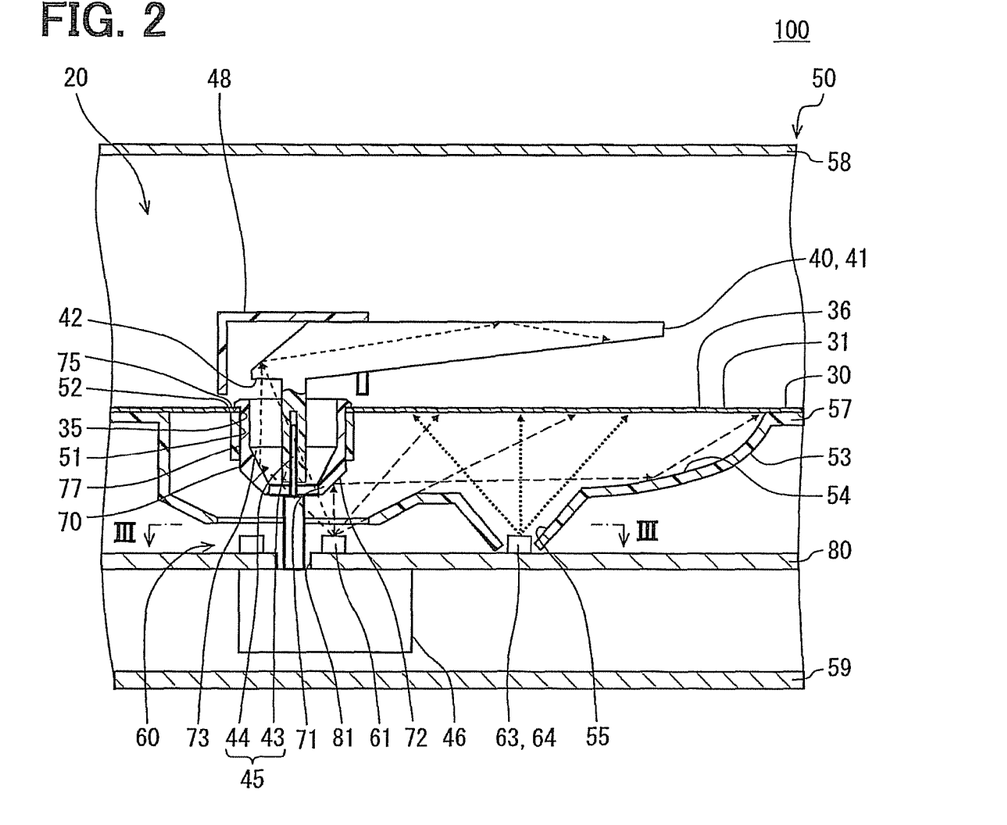
FIG. 2 is a schematic cross-sectional view taken along a line II-II in FIG. 1 and showing a mechanical structure of the combination meter according to the first embodiment.

As shown in FIG. 2, the electric circuit board 80 is made of a rigid board, on which predetermined wiring patterns (not shown) are formed. A circular board-side opening 81, which the shaft portion 45 passes, is formed in the circuit board 80. Various kinds of electronic parts and components are mounted to the circuit board 80, including, for example, the step motor 46, a light source 60 for the indicator 40, a meter control unit 85 (FIG. 7), a light source 63 for the display panel 30, and so on.

Figure 3:
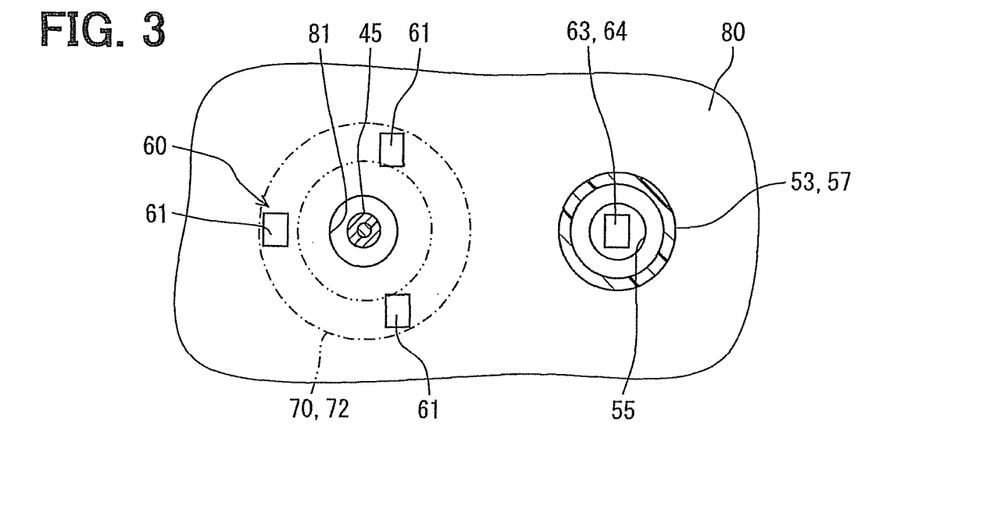
FIG. 3 is a schematic cross-sectional view taken along a line III-III in FIG. 2 and showing a layout of light emitting diodes.

The light source 60 for the indicator 40 is composed of, for example, multiple light emitting diodes 61, which emit light entering the entrance portion 42 of the indicator 40. As shown in FIG. 3, three light emitting diodes 61 are arranged in a circular form surrounding the board-side opening 81 of the circuit board 80 and located at equal distances in a circumferential direction. As shown in FIG. 2, the light emitting diodes 61 are opposed to the entrance portion 42 of the indicator 40 across the panel-side opening 35 in the axial direction of the shaft portion 45.

Figure 7:
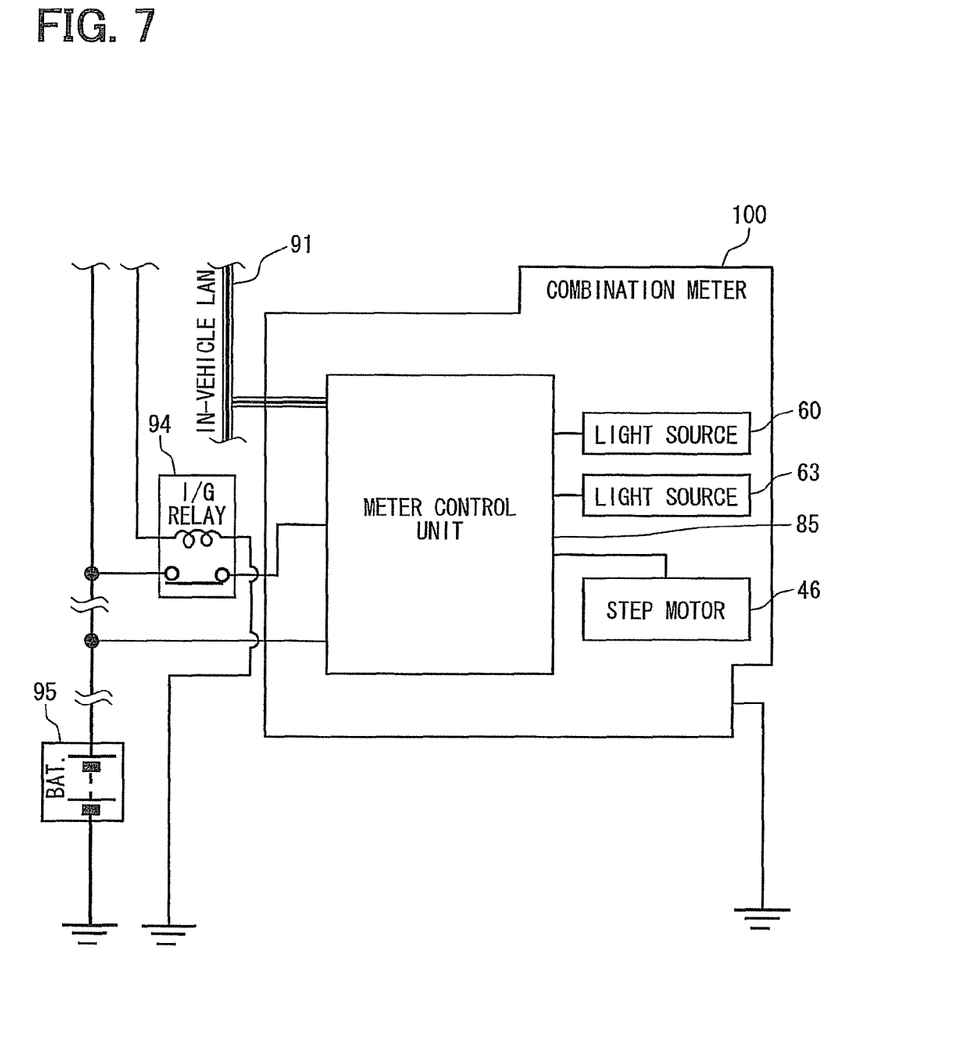
FIG. 7 is a block diagram showing an electrical structure for the combination meter of the first embodiment.

An electrical structure of the combination meter 100 will be explained with reference to FIG. 7.

The combination meter 100 is composed of the meter control unit 85, the light source 60 for the indicator 40, the light source 63 for the display panel 30, the step motor 46 and so on. The combination meter 100 is connected to a battery 95, an in-vehicle LAN (Local Area Network) 91, wires grounded to the earth and so on.

The meter control unit 85 is composed of a micro-computer operating in accordance with predetermined programs and so on. Electric power is supplied from the battery 95 to the meter control unit 85. The meter control unit 85 is connected to the in-vehicle LAN 91 to obtain various kinds of information relating to the vehicle, for example, information for the vehicle speed. The meter control unit 85 is further connected to the light sources 60 and 63 so as to supply the electric power for emitting the lights therefrom. The meter control unit 85 is connected to the step motor 46 so as to supply pulse power thereto based on the information relating to the vehicle speed for moving the driving shaft 44 (FIG. 2).

When an ignition switch (not shown) is turned on, an ignition relay 94 is turned on so that the indicator 40 and the displaying portion 31 are illuminated. In addition, the indicator 40 is rotated to a position corresponding to the vehicle speed in order to indicate the vehicle speed by the speed meter 20.

Characterizing portions of the combination meter 100 of the present embodiment will be explained.

Figure 4:
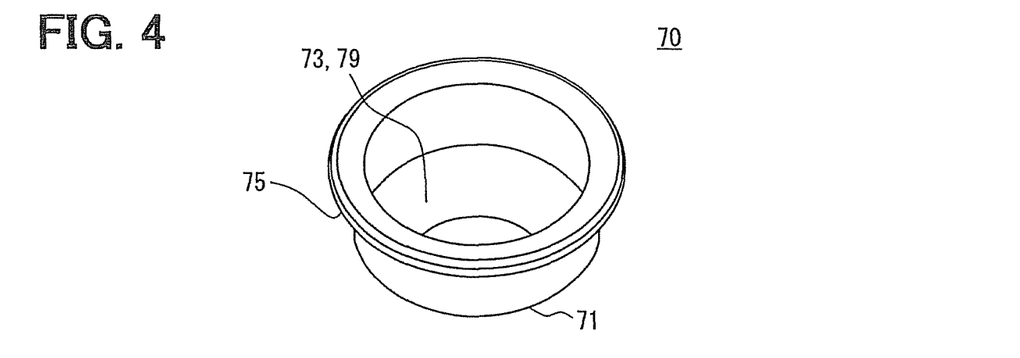
FIG. 4 is a schematic perspective view showing a fixing member of the first embodiment.
Figure 5:
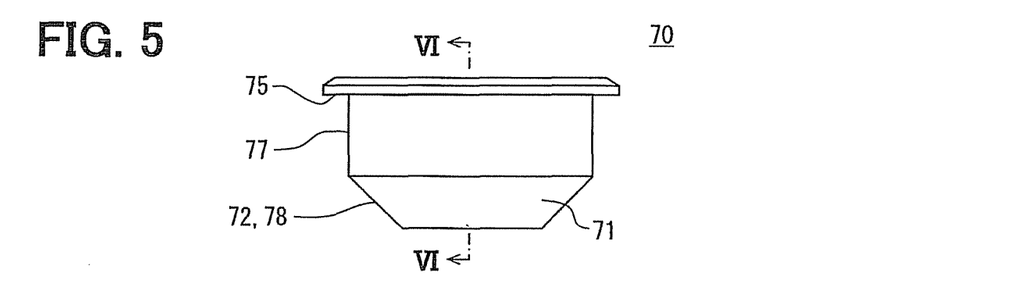
FIG. 5 is a schematic side view of the fixing member.
Figure 6:
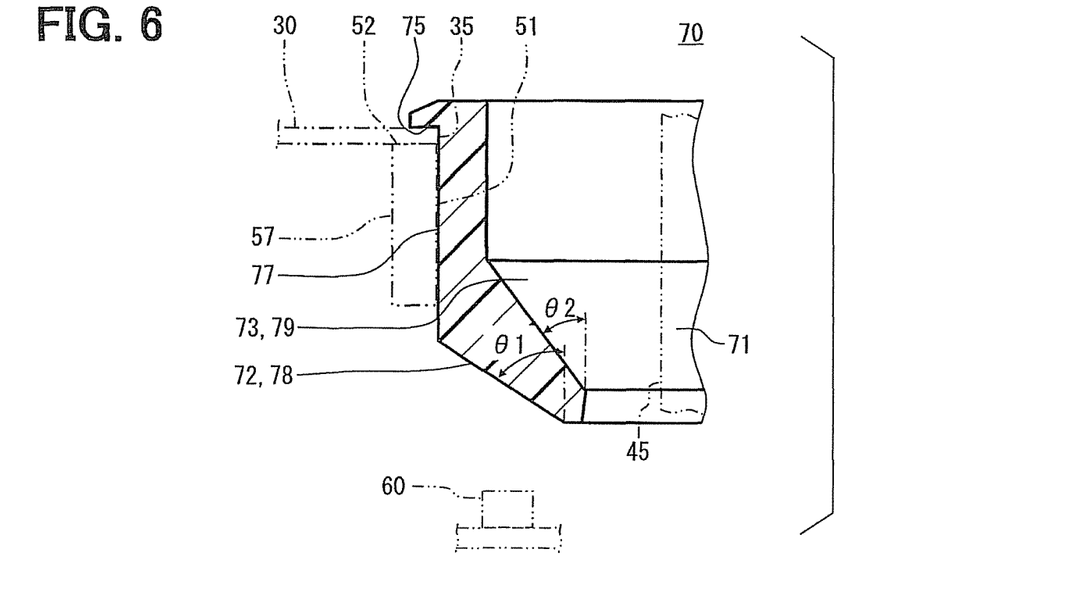
FIG. 6 is a schematically enlarged cross-sectional view taken along a line VI-VI in FIG. 5 and showing a structure of the fixing member.

As shown in FIGS. 4 to 6, an axial lower-side wall 71 of the fixing member 70 is formed in a mortar shape. An outer peripheral surface 78 as well as an inner peripheral surface 79 of the lower-side wall 71 is tapered toward a lower end of the fixing member 70, that is, in a direction to the light source 60 for the indicator 40. In addition, in a cross-sectional plane including a center axis of the fixing member 70, an angle of inclination "θ1" of the outer peripheral surface 78 is larger than that "θ2" of the inner peripheral surface 79. Surface treatment, for example, vapor deposition process or plate processing of metal (such as, aluminum) is done for the outer and inner peripheral surfaces 78 and 79 in order to increase degree of reflection of the light.

As above, the outer peripheral surface 78 of the lower-side wall 71 forms an outer peripheral reflecting portion 72. As shown in FIGS. 2 and 3, the outer peripheral reflecting portion 72 is opposed to the light source 60 for the indicator 40. The outer peripheral reflecting portion 72 is located in an inside of the housing-side reflecting portion 54. According to the above location, the outer peripheral reflecting portion 72 reflects the light from the light source 60 toward the housing-side reflecting portion 54. As shown in FIGS. 2 and 6, since the angle of inclination "θ1" of the outer peripheral surface 78 is different from that of the inner peripheral surface 79, the outer peripheral reflecting portion 72 can be appropriately designed for reflecting the light toward the housing-side reflecting portion 54.

As shown in FIGS. 2 and 4 to 6, the inner peripheral surface 79 of the lower-side wall 71 forms an inner peripheral reflecting portion 73. The inner peripheral reflecting portion 73 is formed so as to be opposed to the entrance portion 42 of the indicator 40, to thereby reflect the light from the light source 60 toward the entrance portion 42. Since the angle of inclination "θ2" of the inner peripheral surface 79 can be different from that of the outer peripheral surface 78, the inner peripheral reflecting portion 73 can be appropriately designed for reflecting the light toward the entrance portion 42.

In addition, as shown in FIGS. 2 and 3, the light source 63 for the display panel 30 is provided at an outer peripheral side of the light source 60 for the indicator 40. The light source 63 is composed of at least one light emitting diode 64. The light source 63 is located at an intermediate position in a radial direction of the display panel 30, that is, between the panel-side opening 35 and the outer periphery of the display panel 30. The light source 63 emits the light in the front-side direction toward the displaying portion 31.

A light entering portion 55 is formed in the reflector 53 of the main body member 57. The light entering portion 55 is located at a position of the reflector 53 in the front-side direction of the light emitting diode 64. The light entering portion 55 is formed as an opening so that the light from the light emitting diode 64 enters a space between the display panel 30 and the reflector 53. The light entering portion 55 is formed in a cone shape, so that a diameter thereof becomes larger as it goes in the front-side direction away from the light emitting diode 64.

According to the above structure of the present embodiment, a part of the light emitted from the light source 60 for the indicator 40 passes through the inside of the fixing member 70, which is inserted into the respective openings 35 and 51, and enters the entrance portion 42 of the indicator 40. In addition, the light emitted from the light source 60 and having reached at the inner peripheral reflecting portion 73 is reflected by the inner peripheral reflecting portion 73, so that such reflected light also enters the entrance portion 42. Accordingly, the light having entered the entrance portion 42 passes through the indicator 40, so that the pointer 41 of the indicator 40 is illuminated.

Another part of the light emitted from the light source 60 for the indicator 40 is reflected by the outer peripheral reflecting portion 72 toward the housing-side reflecting portion 54. Then, such light is further reflected by the housing-side reflecting portion 54 toward the displaying portion 31. In addition, the light emitted from the light source 63 for the display panel 30 passes through the light entering portion 55 and reaches at the displaying portion 31. Therefore, the light reflected by the respective reflecting portions 72 and 54 as well as the light from the light source 63 passes through the display panel 30 so as to radiate those lights from the displaying portion 31.

According to the present embodiment, the fixing member 70 has a function for fixing the display panel 30 to the housing 50 and a function for reflecting the light. Therefore, not only the panel supporting portion 75 can be formed in such a shape suitable for fixing (supporting) the display panel 30, but also the outer peripheral reflecting portion 72 can be arranged at such a location suitable for reflecting the light toward the housing-side reflecting portion 54. As above, the fixing (supporting) of the display panel 30 and the light illumination of the displaying portion 31 can be compatible. In addition, a specific structure (for example, a reflecting plate or the like) for reflecting the light toward the housing-side reflecting portion 54 can be simplified. Furthermore, a number of the light emitting diodes 64 for the light source 63 can be reduced. The combination meter 100 can be thus realized, according to which the fixing (supporting) of the display panel 30 and the illumination of the displaying portion 31 can be assured on one hand, and a number of parts and components can be reduced on the other hand.

In addition, according to the present embodiment, the amount of light entering the entrance portion 42 can be increased by the reflection of the light by the inner peripheral reflecting portion 73 toward the entrance portion 42. Furthermore, the angle of inclination "θ2" of the inner peripheral reflecting portion 73 is set at a most appropriate value for the reflection of the light toward the entrance portion 42, so that the direction of the inner peripheral reflecting portion 73 is set in the most appropriate manner without being influenced by the direction of the outer peripheral reflecting portion 72. Therefore, the amount of light entering the entrance portion 42 of the indicator 40 can be surely increased. Even in a case of the speed meter, in which a part of the light from the light source 60 for the indicator 40 is used for illuminating the displaying portion 31, brightness of the indicator 40 can be maintained at a high value.

In addition, according to the present embodiment, the angle of inclination "θ1" of the outer peripheral reflecting portion 72 is set at a most appropriate value for the reflection of the light toward the housing-side reflecting portion 54, without being influenced by the direction of the inner peripheral reflecting portion 73. Therefore, the amount of light passing through the displaying portion 31 can be surely increased. In addition, since not only the light from the light source 60 for the indicator 40 but also the light from the light source 63 for the display panel 30 passes through the displaying portion 31, a larger amount of the light can be obtained for the displaying portion 31. Furthermore, since the light source 63 for the display panel 30 is located closer to the displaying portion 31 than the light source 60 for the indicator 40, the brightness for the displaying portion 31 can be increased or maintained even when the light source 63 for the display panel 30 is composed of a smaller number of light emitting diodes 64.

In the present application, the display panel 30 is also referred to as "a display member", the panel-side opening 35 is also referred to as "an opening", the fixing member 70 is also referred to as "a cylindrical member", the panel supporting portion 75 is also referred to as "a cylindrical-member supporting portion", and the combination meter 100 is also referred to as "an indicator displaying device".

(Second Embodiment)

As shown in FIGS. 8 to 12, a second embodiment of the present 30 disclosure is a modification of the first embodiment. In the second embodiment, parts and/or portions corresponding to the light source 63 for the display panel 30 and the light entering portion 55 of the first embodiment are removed. In addition, multiple notched portions 276 are formed in the axial lower-side wall 71 of the fixing member 70, so that the light from the light source 60 passes through notched portions 276 in the axial direction. Each of the notched portions 276 is formed in a rectangular shape by cutting away a portion of the lower-side wall 71. In the present embodiments, three notched portions 276 are formed and arranged at the lower-side wall 71 at equal intervals in the circumferential direction of the fixing member 70.

Figure 8:
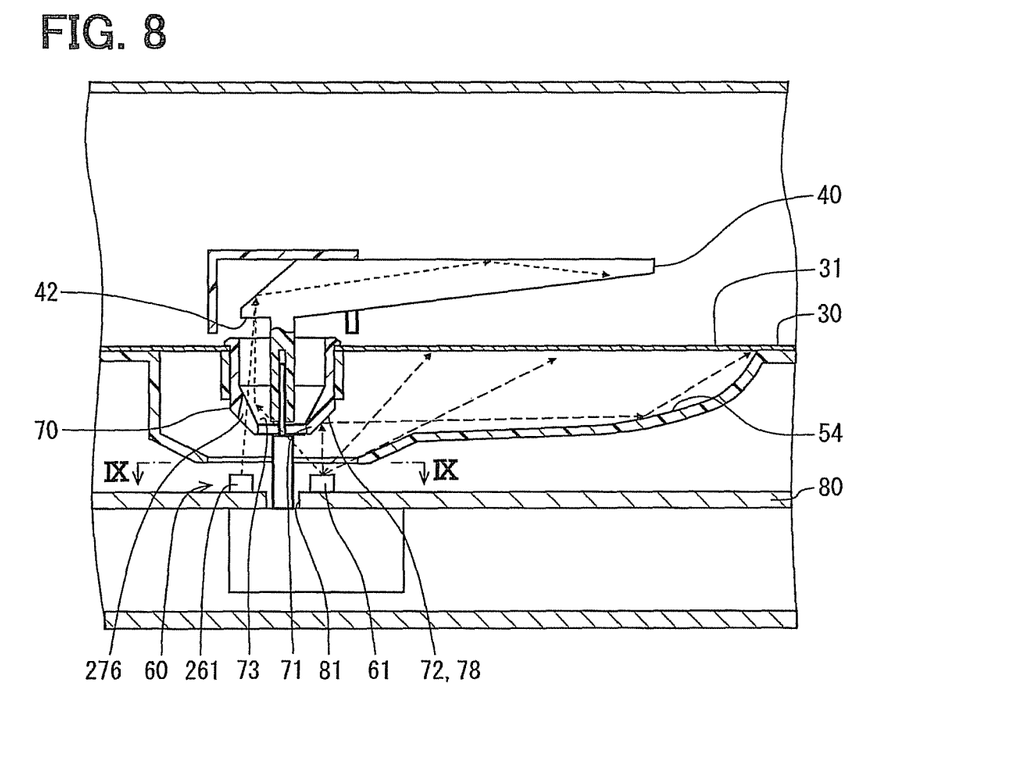
FIG. 8 is a schematic cross-sectional view taken along a line VIII-VIII in FIG. 9 and showing a mechanical structure of the combination meter according to a second embodiment of the present disclosure (that is, a modification of FIG. 2)
Figure 9:
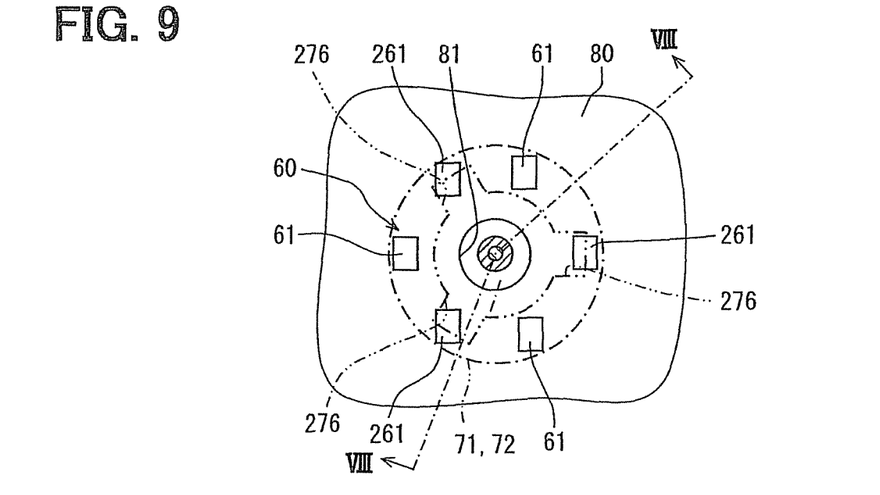
FIG. 9 is a schematic cross-sectional view taken along a line IX-IX in FIG. 8 and showing a layout of light emitting diodes.
Figure 10:
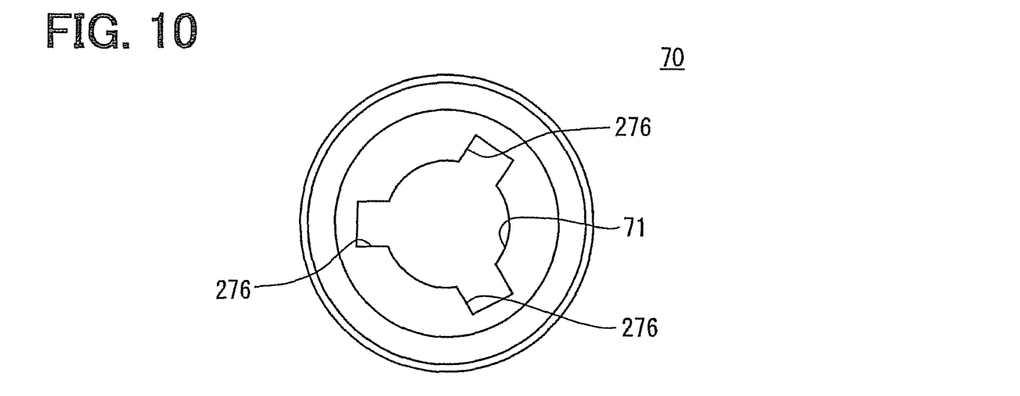
FIG. 10 is a schematic top plane view showing a fixing member of the second embodiment.
Figure 11:
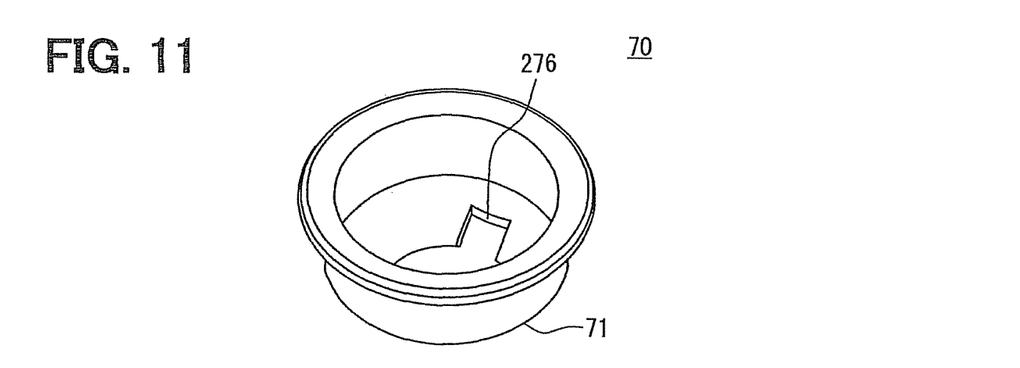
FIG. 11 is a schematic perspective view of the fixing member, and FIG. 11 corresponds to FIG. 4.
Figure 12:
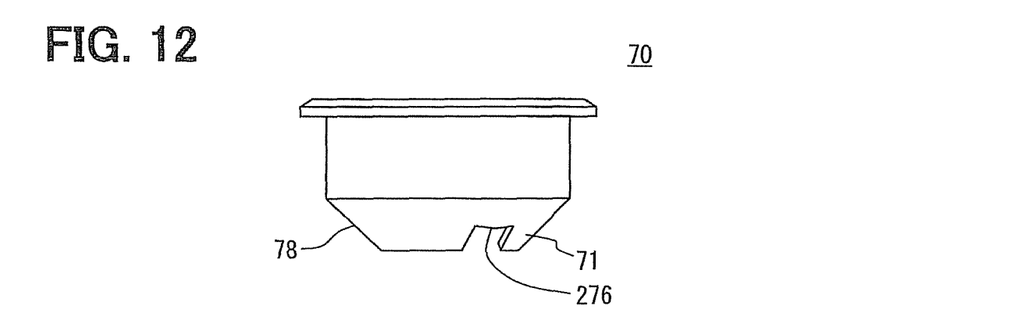
FIG. 12 is a schematic side view of the fixing member, and FIG. 12 corresponds to FIG. 5.

As shown in FIGS. 8 and 9, the light source 60 is composed of the multiple (three) light emitting diodes 61 located at such positions on the circuit board 80 in the rear-side direction of the outer peripheral reflecting portions 72 and multiple (three) light emitting diodes 261 located at such positions on the circuit board 80 in the rear-side direction of the respective notched portions 276. The light emitting diodes 61 and 261 are arranged in a circular form so as to surround the board-side opening 81 and located at equal intervals in the circumferential direction.

According to the second embodiment of the above structure, the light emitted from the light emitting diodes 61 are reflected by the outer peripheral reflecting portion 72 and the housing-side reflecting portion 54, so that the displaying portion 31 of the display panel 30 is illuminated. In addition, the light emitted from the light emitting diodes 261 passes through the notched portions 276 without being blocked out by the lower-side wall 71 and enters the entrance portion 42 of the indicator 40. Since a part of the light from the light emitting diodes 61 is reflected by the inner peripheral reflecting portion 73 and also enters the entrance portion 42, the amount of light entering the entrance portion 42 of the indicator 40 can be surely obtained. As above, even in the case in which the light emitting diodes 61 are commonly used for illuminating the indicator 40 and the displaying portion 31 of the display panel 30, the brightness of the indicator 40 can be maintained at a high value by the light from the light emitting diodes 261.

In the second embodiment, the notched portions 276 are also referred to window portions.

(Third Embodiment)

Figure 13:
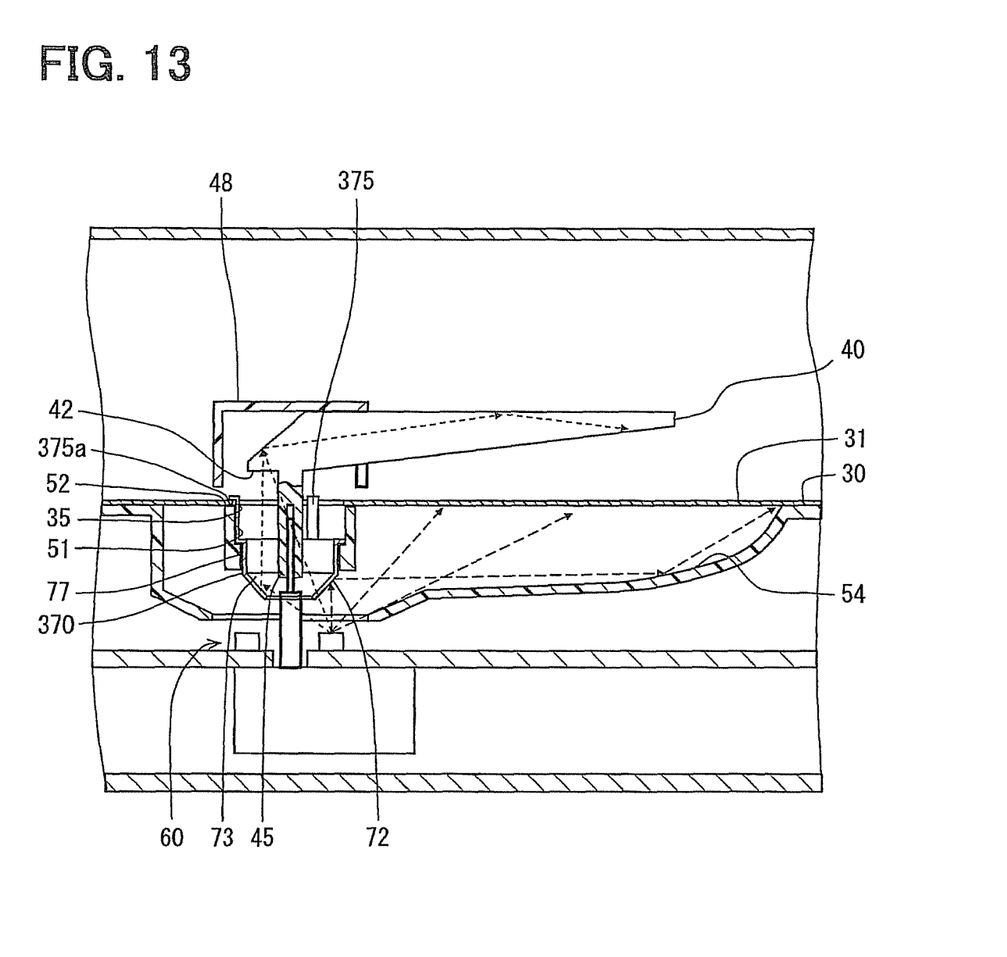
FIG. 13 is a schematic cross-sectional view showing a mechanical structure of the combination meter according to a third embodiment of the present disclosure, and FIG. 13 corresponds to a modification of FIG. 8.

As shown in FIG. 13, a third embodiment of the present disclosure is a modification of the second embodiment. A fixing member 370 of the third embodiment is made of metal having a high degree of reflection, such as aluminum, for example by press forming. The fixing member 370 has the outer peripheral reflecting portion 72, the inner peripheral reflecting portion 73 and the main body 77, which are the same to those of the first embodiment. The fixing member 370 further has panel supporting portions 375, which correspond to the panel supporting portion 75 of the first embodiment.

In the third embodiment, the fixing member 370 is deeply inserted into the housing-side opening 51 so as to prevent or suppress leakage of the light reflected by the fixing member 370 through a gap between the cap member 48 and the display panel 30. In other words, an axial upper-side end of the fixing member 370 is inserted to such a position, which is lower than a level of the display panel 30. Instead, multiple (three) panel supporting portions 375 are formed in a leg shape extending from the upper-side end of the fixing member 370 (that is, the main body 77) in the axial direction of the shaft portion 45, namely in the front-side direction. The three panel supporting portions 375 are arranged at equal intervals in the circumferential direction. In addition, each forward end 375a of the panel supporting portion 375 is bent in a radial outward direction. According to the above structure, the outer periphery of the panel-side opening 35 of the display panel 30 is interposed between the bent forward ends 375a and the housing-side supporting portion 52 of the housing-side opening 51, so that the display panel 30 is fixed to the housing-side opening 51.

According to the third embodiment of the above structure, the light, which is emitted from the light source 60 for the indicator 40 and reached at the inner peripheral reflecting portion 73, is reflected by the inner peripheral reflecting portion 73 so as to enter the entrance portion 42. In addition, the light, which is emitted from the light source 60 for the indicator 40 and sequentially reflected by the outer peripheral reflecting portion 72 and the housing-side reflecting portion 54, passes through the displaying portion 31. As above, the indicator 40 as well as the displaying portion 31 is illuminated by the light from the light source 60. Therefore, the fixing (supporting) of the display panel 30 and the light illumination of the displaying portion 31 can be compatible by the simple structure of the fixing member 370. The fixing (supporting) of the display panel 30 and the illumination of the displaying portion 31 can be assured on one hand, while a number of parts and components can be reduced on the other hand.

In the present embodiment, the fixing member 370 maybe made of metal, for which plating is treated on a surface thereof. Alternatively, the fixing member 370 may be made of stainless steel with buff finish.

(Further Embodiments)

The present disclosure should not be limited to the above embodiments. The present disclosure can be modified in various manners without departing from the spirit of the present disclosure.

In the above embodiments, the housing-side reflecting portion 54 is formed by the curved surface of the parabolic shape. The shape of the housing-side reflecting portion 54 can be modified in various manners, so that the light emitted from the light source 60 and reflected by the outer peripheral reflecting portion 72 can be effectively reflected toward the displaying portion 31. For example, the housing-side reflecting portion may be formed in a conical-surface shape.

In the above embodiments, the inner peripheral reflecting portion 73 is formed on the inner peripheral surface 79. However, the inner peripheral reflecting portion 73 may not be always formed. In addition, the angle of inclination "θ2" of the inner peripheral surface 79 (with respect to a center axis of the fixing member) may be equal to the angle of inclination "θ1" of the outer peripheral surface 78, or even larger than the angle of inclination "θ1". The angles of inclination "θ1" and "θ2" can be decided in an appropriate manner depending on locations of the light source (for the indicator and/or the display panel, the entrance portion, the housing-side reflecting portion, the displaying portion and so on.

In the display panel 30, the scale marks 32, the numerical characters 33 and the unit 34 are provided as those parts for forming the displaying portion 31. In a modification, at least one of the above parts 32, 33 and 34 is formed as the displaying portion 31, so that the light passes through such portion of the display panel 30 and thereby the displaying portion 31 is illuminated by such light.

White-color painting (for the purpose of increasing the degree of reflection) may be done on a rear side surface of the display panel 30 in such an area, in which the black-color painting having the light blocking-out effect is done on the front-side surface.

In the above first embodiment, the light source 63 for the display panel 30 has one light emitting diode 64. However, the number of the light emitting diodes 64 can be changed depending on required brightness for the displaying portion 31. In a similar manner, the number of the light emitting diodes 61 and 261 may be changed depending on the required brightness for the indicator 40 and the displaying portion 31.

In the above embodiments, the present disclosure is applied to the speed meter of the vehicle. The present disclosure can be applied to any other meters and/or instruments, which have an indicator and a displaying portion illuminated by a light source.

What is claimed is:

1. An indicator displaying device comprising:
   a rotatable indicator including: a shaft portion around which the rotatable indicator is rotated; and an entrance portion through which light enters the rotatable indicator, so that the rotatable indicator is illuminated by the light having entered from the entrance portion;
   a display unit that displays information together with the rotatable indicator, the display unit including: an opening through which the shaft portion passes; and a displaying portion provided at an outer peripheral side of the opening and illuminated by light passing therethrough;
   a first light source opposite to the entrance portion in an axial direction of the shaft portion across the opening, the first light source emitting light which enters the entrance portion;
   a housing having: a supporting portion that supports the display unit; and a reflecting portion that is positioned between the first light source and the display unit to be opposite to the displaying portion and reflects light toward the displaying portion;
   a cylindrical body inserted into the opening in the axial direction of the shaft portion, the cylindrical body having a supporting portion in order to hold the display unit between the supporting portion of the cylindrical body and the supporting portion of the housing, the cylindrical body further having an outer peripheral reflecting portion formed by an outer peripheral surface, which is tapered in a direction toward the first light source, the outer peripheral reflecting portion reflecting the light from the first light source toward the reflecting portion of the housing; and
   a window portion formed in the axial lower-side wall of the cylindrical body, which is tapered in the direction toward the first light source, wherein
   the first light source includes (i) a first light portion that faces the outer peripheral reflecting portion and that emits light toward the outer peripheral reflecting portion, and (ii) a second light portion that faces the window portion and that emits light toward the window portion so that the light passes through the window portion and reaches the entrance portion;
   the window portion comprises a plurality of notched portions; and
   the second light portion includes a first plurality of light emitting diodes, each light emitting diode being aligned with a respective one of the plurality of notched portions.

2. The indicator displaying device according to claim 1, wherein
   the cylindrical body has an inner peripheral surface, which is formed on an opposite side of the cylindrical body relative to the outer peripheral surface, and
   the inner peripheral surface forms an inner peripheral reflecting portion that reflects the light emitted from the first light source toward the entrance portion.

3. The indicator displaying device according to claim 2, wherein
   an angle of inclination for the outer peripheral surface with respect to a center axis of the cylindrical body is different from that for the inner peripheral surface with respect to the center axis, in a longitudinal cross-section of the cylindrical body.

4. The indicator displaying device according to claim 1, further comprising:
   a second light source provided at an outer peripheral side of the first light source and emitting light toward the displaying portion.

5. The indicator displaying device according to claim 1, wherein
   the second light portion is separate from the first light portion.

6. The indicator displaying device according to claim 1, wherein
   the first light portion includes a second plurality of light emitting diodes separate from the first plurality of diodes.

* * * * *